United States Patent [19]

Hattori

[11] Patent Number: 5,342,166
[45] Date of Patent: Aug. 30, 1994

[54] CERAMIC GAS-TURBINE NOZZLE WITH COOLING FINE HOLES AND METHOD FOR PREPARING THE SAME

[75] Inventor: Mitsuru Hattori, Ama, Japan

[73] Assignee: NGK Insulators, Ltd., Japan

[21] Appl. No.: 38,808

[22] Filed: Mar. 29, 1993

[30] Foreign Application Priority Data

Apr. 6, 1992 [JP] Japan .................. 4-083857

[51] Int. Cl.⁵ ............................................. F01D 5/18
[52] U.S. Cl. .................................. 415/115; 415/200; 416/241 R
[58] Field of Search ............. 415/200, 115, 116; 416/241 RA

[56] References Cited

U.S. PATENT DOCUMENTS

| | | | |
|---|---|---|---|
| 4,492,522 | 1/1985 | Rossmann et al. | 415/200 |
| 4,639,189 | 1/1987 | Rosman | 415/200 |
| 5,090,866 | 2/1992 | Blair | 415/115 |
| 5,151,325 | 9/1992 | Draskovich | 415/200 |
| 5,192,192 | 3/1993 | Ourhaan | 415/115 |
| 5,209,644 | 5/1993 | Dorman | 416/241 R |

FOREIGN PATENT DOCUMENTS 56-42401 10/1981 Japan .
4-219205 8/1992 Japan .

*Primary Examiner*—John T. Kwon
*Attorney, Agent, or Firm*—Parkhurst, Wendel & Rossi

[57] ABSTRACT

To improve the precision of the cooling fine holes of a large-sized and complex-shaped ceramic gas-turbine nozzle with fine cooling holes, a ceramic gas-turbine nozzle with fine cooling holes has a profile degree of 1.0% or less relative to the blade length, a roundness of the fine cooling holes of 0.3 mm or less, and a straightness of the fine cooling fine holes of 1% or less relative to the blade length. This nozzle is prepared by a method in which two compacts of shroud portions and at least one compact of a blade portion and separately molded are joined by isotropic press molding to be calcined, and the predetermined positions of the resulting calcined compact are subjected to supersonic processing to bore cooling fine holes, the resulting compact is then fired.

4 Claims, 1 Drawing Sheet

CERAMIC GAS-TURBINE NOZZLE WITH COOLING FINE HOLES AND METHOD FOR PREPARING THE SAME

BACKGROUND OF THE INVENTION

The present invention relates to a ceramic gas-turbine nozzle with fine cooling fine holes and a method for preparing the same. The ceramic gas-turbine nozzle with fine cooling holes of the present invention can be preferably used as, for example, a dynamo gas turbine nozzle.

Recently, dynamo gas turbines have been intensively developed in order to achieve energy-savings, decreased environmental pollution and usability of various fuels. Particularly, the research for development of a gas turbine with large heat efficiency or high energy savings is vigorously performed, and causes the related researchers to focus their attention on a problem that the inlet gas temperature (TIT) of the turbine is elevated to improve the efficiency of heat engines. In fact, a metal gas turbine using a heat-resistant alloy has a maximum inlet gas temperature of 1350° C.

An attempt has been made to further elevate the turbine inlet gas temperature by applying ceramics which are superior excellent in heat resistance than the heat-resistant alloy to parts such as gas turbine blades, and so gas turbines using a ceramic have already been developed which have almost the same TIT as those using a heat-resistant alloy. Thus, the current development of gas turbines aims at preparing those with a TIT of nearly 1500° C.

When a ceramic component, however, is used for a gas turbine nozzle having a TIT of more than 1500° C., a local area having a TIT of more than 1600° C. may be present. Under such circumstances, even if a desired heat-resistant ceramic is obtained, there arise problems of decrease in mechanical strength, or potential influence of erosion or corrosion, reduced reliability, shortened service life and the like.

The present inventors have now developed a ceramic component with fine cooling fine holes in which a refrigerant carrier flows through the fine holes bored at predetermined positions in the ceramic component to improve the heat resistance of the ceramic component, Japanese Patent Laid-Open No. 4-219205 (Japanese Patent Application No. 3-87581). Since the surface of this ceramic component is cooled by a refrigerant carrier, even if the TIT is elevated to 1500° C. or more, the surface of the ceramic gas-turbine nozzle is kept at lower temperatures, e.g., about 1100° C.; thus there are no problems of decreased reliability and mechanical strength and the like under a higher temperature. The lower temperatures hardly have adverse effects on the heat efficiency of these gas turbines.

However, the publicly known methods have disadvantages if the ceramic component is provided with the fine cooling holes. Examples of the conventional methods by which the fine holes are bored include a method where piano wire or the like is placed in the mold at the time of injection molding, or grinding processing or supersonic processing after sintering.

For example, when injection molding is performed, there are problems that the piano wire is cut off because of the increased pressure of injection molding, and the position and the like of fine holes are limited depending on the mold structure. There are also problems that the fine holes having smaller diameters may make it impossible to successfully release the fine hole portions from the mold.

Similarly, only straight fine holes can be made by the grinding process or supersonic process after sintering, with the limitation of their deepness. These processings make the beveling processing impossible. Particularly, when the fine hole is to be made so as to have a diameter of about 0.5 mm, its processing time will be greatly prolonged and its mass production will be poorly attained.

Alternatively, when a ceramic is applied to the gas-turbine nozzle parts, there arises a problem characteristic of the gas turbine nozzle. Having large size, the gas turbine nozzle provides complex shapes, so that the conventional methods for preparing ceramic parts have great limitations of parts' shapes and dimensions, which are ascribed to their molding shape, moldability, sinterability, processability and the like. For example, in the case of a large-sized gas-turbine nozzle, the larger body makes it difficult to be molded by even any method such as injection molding and press molding. Particularly, the present method of injection molding does not provide the resulting moldings with uniform density, and so their large deformation caused after sintering cannot mold the compacts or parts with close shape-precision.

Examples of gas turbines having more complex shapes include a gas turbine in which plural blades are put between the inside shroud portion and the outside shroud portion to align linearly or in the form of an arc. There arises a great problem that it is difficult to mold a gas turbine nozzle having a complex shape, which causes undercuts. Thus, when forming a gas turbine in such a shape which will cause undercuts, it is clearly impossible to prepare compacts using the ordinary mold.

SUMMARY OF THE INVENTION

Accordingly, an object of the present invention is to provide a ceramic gas-turbine nozzle with cooling fine holes which has a large-sized and complex shape, (their dimensions, structure and the like having been previously limited because ceramics were made into large-sized parts) and has a more improved precision than the earlier one; and a method for preparing the same.

According to another aspect of the present invention, there is provided a method for preparing a ceramic gas-turbine nozzle with fine cooling holes though it is difficult to process fine holes by the conventional method.

In order to achieve the above objects, according to one aspect of the present invention, there is provided a ceramic gas-turbine nozzle comprising at least one blade portion having a hollow cavity in the interior and being provided with fine cooling holes, and shroud portions integrally joined with said blade portion, and at least one of said shroud portions being provided with a throughhole, said ceramic gas-turbine nozzle having a profile degree of 1.0% or less relative to the blade length, said fine cooling holes having a roundness of 0.3 mm or less and having a straightness of 1% or less relative to the blade length.

According to the present invention, the blade portion and the shroud portions preferably are prepared using a ceramic which has an initial JIS four-point flexural strength of 600 MPa or more, a fatigue parameter (N) of 50 or more at a temperature of 1400° C., and a JIS four-point flexural strength of 50% or more relative to the initial JIS four-point flexural strength and a heat-resistant impact strength of 70% or more relative to an initial heat-resistant impact strength after the blade portion and the shroud portions are maintained at 1400° C. for 10000 hours.

Furthermore, according to another aspect of the present invention, there is provided a method for preparing a ceramic gas-turbine nozzle comprising molding compacts of shroud portions and at least one compact of blade portion separately, joining said compacts of shroud portions and said compact of blade portion to obtain a joined compact by isotropic press molding, calcining said joined compact to obtain a calcined compact; working predetermined positions of said calcined compact by a supersonic processing to bore fine cooling holes in said calcined compact; and then firing said calcined compact.

The method according to the present invention is capable of preparing a ceramic gas-turbine nozzle with fine cooling holes which has a large-sized and complex shape, their dimensions, structure and the like having been previously limited because ceramics were made into large-sized parts, and has a more improved precision than the earlier one.

DETAILED DESCRIPTION OF THE INVENTION AND PREFERRED EMBODIMENTS

The present invention is illustrated with reference to the following examples shown in the Figures, but the invention is not intended to be limited only to these following examples.

Figure 1:
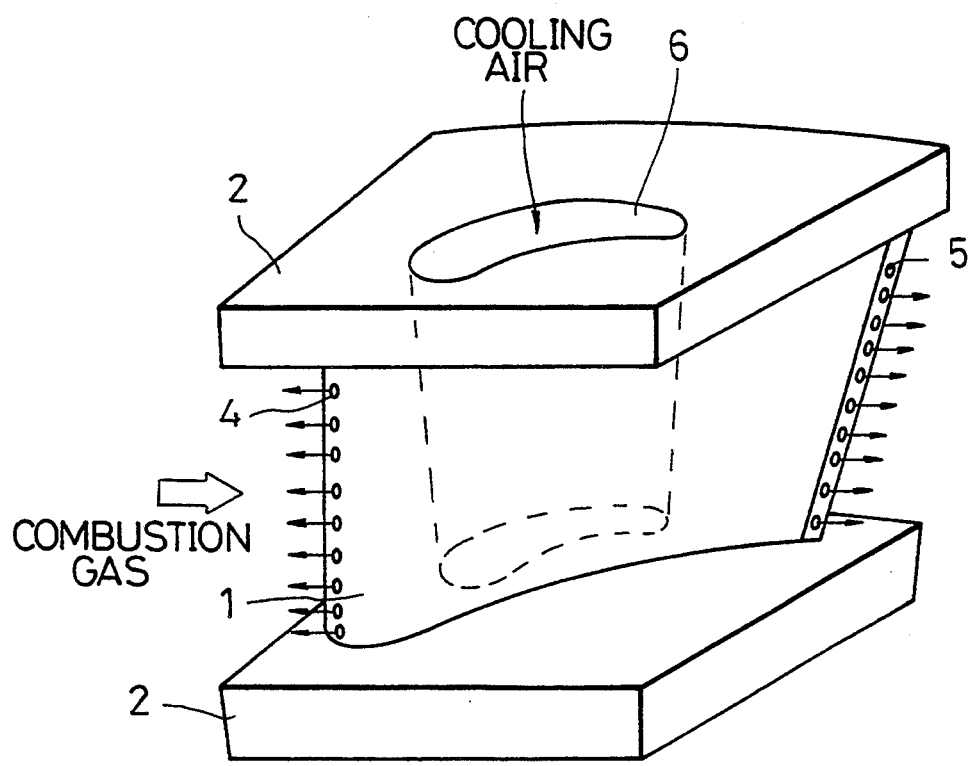
FIG. 1 is a perspective view which shows one example of a ceramic gas-turbine nozzle with fine cooling holes according to the present invention.
Figure 2:
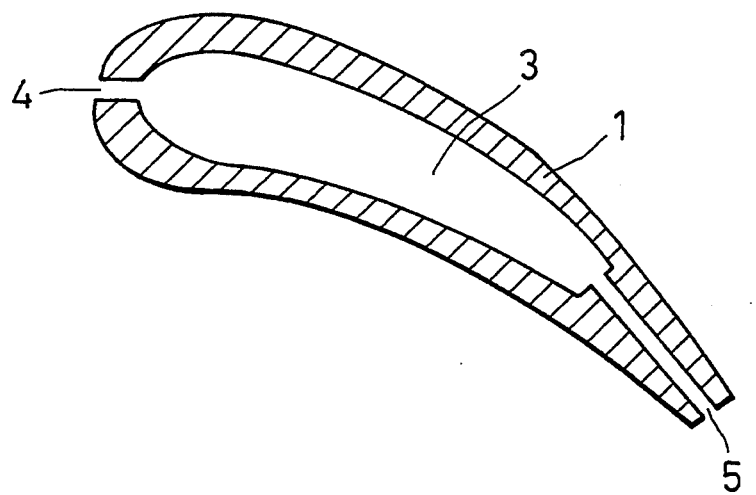
FIG. 2 is a schematic sectional view which shows one example of a blade portion of a ceramic gas-turbine nozzle with fine cooling holes according to the present invention.

In a ceramic gas-turbine nozzle with fine cooling holes by the method of the present invention, one or more blade portions are placed between the inside shroud portion and the outside shroud portion. As shown in FIGS. 1 and 2, the interior of the respective blade portion 1 occupies the hollow cavity 3 sandwiched between both of the shroud portions 2 which are placed in the opposite sides. The interior of this hollow cavity 3 communicates with the fine cooling holes 4 and fine cooling holes 5 which are formed almost parallel to the shroud portion 2. The fine cooling holes 4 are bored into the end of the blade portion 1 which is formed smoothly. On the other hand, the fine cooling fine holes 5 are bored into the opposite end of the blade portion 1 which is formed slenderly. Providing the ceramic gas-turbine nozzle with both of the fine cooling holes 4 and the fine cooling holes 5 is preferable to cool the blade, but even providing either of them can preferably cool the same. One or both of the shroud portions 2 has(have) throughholes 6 which communicate the hollow cavity 3 to the external space of the shroud portion 2.

The fine cooling holes 4 and 5 are bored by supersonic processing. Though not limited, the sectional shapes of which are preferred to be in the form of a circle, slit or the like. Further, the fine hole may be linear or curved. Although the deepness of the fine hole is preferred to be in the range from 20 mm to 70 mm, the ceramic gas-turbine nozzle with fine holes prepared by the method of the present invention is not limited to this range. The size and shape-precision of the ceramic gas-turbine nozzle with fine holes prepared by the method of the present invention, particularly, the shape-precision of fine holes will be described below.

A refrigerant carrier is introduced from the throughhole 6, passed through the hollow cavity 3, and discharged from the cooling fine holes 4 and/or 5, so that the outer surface of the ceramic gas-turbine nozzle is cooled. Either gases or liquids can be used as the refrigerant carrier, but air or water is preferably used in terms of the cost. If the ceramic gas-turbine nozzle is exposed with a combustion gas, by introducing, for example, the cooling air of a temperature of 400° C. as a refrigerant carrier from the throughhole 6, the temperature of the cooling air becomes 800°–900° C. at the outlet of the cooling fine holes 5, and at the same time the surface temperature of the ceramic gas-turbine nozzle becomes 1100°–1400° C. When these cooling conditions are compared with cooling of the metal gas turbine, decreased heat efficiency of the ceramic gas-turbine nozzle is low because a smaller amount of the refrigerant carrier can be used.

Preferred ceramic gas-turbine nozzles with fine cooling holes according to the present invention have a larger heat resistance and decreased deterioration in the mechanical strength even at a higher temperature, such as silicon nitride, silicon carbide, stabilized zirconia, partially stabilized zirconia and alumina.

Examples of the ceramics used in the present invention which have preferred physical properties include a ceramic which has an initial JIS four-point flexural strength of 600 MPa or more, a fatigue parameter (N) of 50 or more at a temperature of 1400° C., and a JIS four-point flexural strength of 50% or more relative to the initial JIS four-point flexural strength and a heat-resistant impact strength of 70% or more, or the other materials' physical properties of 80% or more relative to the initial values.

The method according to the present invention for preparing the ceramic gas-turbine nozzle with cooling fine holes will be described. For brief description, a ceramic gas-turbine nozzle with fine cooling holes in which two shroud portions 2 and one blade portion 1 are joined will be described. The present invention is not limited to the ceramic gas-turbine nozzle with fine cooling holes having such a simple shape, and so the ceramic gas-turbine nozzle with fine holes having complex shapes with plural blade portions 1 is also prepared by the method according to the present invention.

By the method of the present invention, two shroud portions 2 and one blade portion 1 are separately molded, and then the three compacts are integrally joined. After the joined portions are calcined and the calcined portions are subjected to supersonic processing to form fine cooling holes, the resulting portions are fired and mechanically processed so as to prepare the ceramic gas-turbine nozzle with fine cooling holes.

First, after a sintering auxiliary is added to a ceramic raw material suitable for the desired ceramic and mixed, binder(s) and the like are added to it and kneaded to obtain the raw material for molding.

Secondly, two shroud portion compacts and one blade portion compact as shown in FIG. 1 are molded using the raw material by preferable molding method(s) such as injection molding, press molding, and slip casting. The hollow cavity 3 and the shroud throughhole 6 are formed during the molding processes. All compacts are not necessarily molded by the identical method, but may be molded by a combination of appropriate methods. However, when these portions are molded, shrinkage upon joining the portions by isotropic press molding in the next process should be considered. In this process, the shape and size of the portions can be selected so that deformation of these portions will be minimized after sintering. Then organic matter is eliminated from these compacts by suitable methods, depending on molding, such as degreasing and calcination to remove binder.

After the joint surfaces of the resulting compacts are processed, both of the compacts are integrally joined by isotropic press molding. Since the shroud portion compacts and the blade portion compact which were separately molded are then integrally molded according to the present invention, a complex-shaped ceramic gas-turbine nozzle with fine cooling holes in which undercuts will be made can be easily prepared. Individual molding of the shroud portions 2 and the blade portion 1 makes the size of each compact smaller compared with molding the gas turbine nozzle as a whole, so that these portions can be easily molded as well as the compacts having more close shape-precision. The integrated compacts are calcined at temperatures and under atmosphere depending on the kind of ceramic used to obtain calcined compacts.

These calcined compacts are subjected to supersonic processing at the predetermined positions to form the fine cooling fine holes 4 and/or 5. Since supersonic processing is subjected to the calcined compact rather than the fired compact, the processing time is largely shortened as well as the processing resistance is decreased, so that shape-precisions such as roundness and straightness and the like of the bored fine holes are improved (Table 1). Particularly, when fine holes having a diameter of 1 mm or less are to be formed, calcined compacts are preferably subjected to the supersonic processing.

TABLE 1

| blade length (mm) | profile degree (mm) | | roundness (mm) | | straightness (mm) | |
| --- | --- | --- | --- | --- | --- | --- |
| | methods according to | | | | | |
| | the present inven. | the prior art | the present inven. | the prior art | the present inven. | the prior art |
| 50 | 0.1 | 1 | 0.05 | 0.5 | 0.1 | 1 |
| 150 | 0.2 | 2 | 0.05 | 0.5 | 0.3 | 3 |

When a subject to be processed are subjected to the supersonic processing, a tool applicable to the desired shape is first produced, and the resulting tool is fit on the top of a hone. After the subject is coated with granulated whetstone, the hone is vibrated up and down to grind the subject by the granulated whetstone present between the tool and the subject.

Then, the subject is fired at firing temperatures and under a firing atmosphere depending on the kinds of ceramics to obtain sintered compact. When the sintered compact of the shroud portion 2 is ground, the fitting position between the metal portion and the shroud portion is preferably subjected to cylindrical or planar grinding using a predetermined diamond whetstone. The fitting position required to have a high precision is preferably subjected to the grinding processes. It is not necessary to subject the other positions to the grinding processes after sintering.

Then, Examples are hereinafter illustrated in more detail.

EXAMPLE 1

Two parts by weight of strontium oxide, 3 parts by weight of magnesium oxide and 3 parts by weight of cerium oxide as sintering auxiliaries are blended to 100 parts by weight of silicon nitride powder, then ground to obtain a mixture of powder having an average particle size of 0.5 $\mu$m. The thus obtained mixture was spray-dried to obtain a granule having an average particle size of 30 $\mu$m.

Using the granule which was obtained by spray drying as a row material for the press molding, two compacts of the shroud portions shown in FIG. 1 were obtained by subjecting the granule itself to a molding pressure of 0.5 ton/cm$^2$. The surface of the shroud portion compact was finished by machining the joint interface of the compact.

On the other hand, when a raw material for the injection molding is prepared, 3 parts by weight of ethylene-vinyl acetate copolymer as an organic binder, 15 parts by weight of paraffin wax as a plasticizer, and 2 parts by weight of stearic acid as a plasticizer were blended to 100 parts by weight of the granule obtained by spray drying to knead. The mixture was extruded by a extruder to be in the form of a pellet, which was used to mold the blade portion compact having the shape shown in FIG. 1 by injection molding.

After the blade portion compact was degreased at 300° to 500° C., the surface of the blade portion compact was finished by machining the joint interface of the compact in a similar manner to machining the shroud portion compacts obtained by press molding.

The above-mentioned blade portion compact and two shroud portion compacts were combined at the joint surface, and integrally joined by cold isotropic press molding under a pressure of 3 to 5 ton/cm$^2$ to obtain the joined compact as shown in FIG. 1.

The joined compact was calcined at 1000° C. for 30 minutes, and then the calcined compact was subjected to the supersonic processing to bore fine cooling holes. The resulting calcined compact was fired at 1700° C. in nitrogen atmosphere to obtain a fired body. Finally, the area of shroud portions 2 of the fired compact which attaches to other parts was ground with a diamond hone to obtain the ceramic gas-turbine nozzle with cooling fine holes according to the present invention.

EXAMPLE 2

The ceramic gas-turbine nozzle with fine cooling holes was prepared in the similar manner to that in Example 1 except that the two shroud portions were molded by the injection molding rather than the two-step press molding.

EVALUATION

The ceramic gas-turbine nozzle with fine cooling holes obtained in the above-mentioned Example 1 was tested for the evaluation of the following physical properties.

The ceramic gas-turbine nozzles with fine cooling holes shown in FIG. 1, which was obtained in Example 1 and 2, was maintained in a flowing combustion gas at 1500° C. for 100 hours, while cooling air at 300° to 400° C. whose volume was 1 to 5% relative to the total compressed air flowed through the cooling fine holes. As a result, both of the ceramic gas-turbine nozzles with fine cooling holes have an average surface temperature of 1200° C.

When flowing of the combustion gas was stopped to observe the ceramic gas-turbine nozzle after the test, there were no changes in any nozzles. Further, the test pieces which were excised from the nozzle after the test were subjected to tests such as a four-point flexural strength test, showing nearly the same values as those of the initial strength, and thus there were no changes in the strength.

What is claimed is:

1. A ceramic gas-turbine nozzle, comprising:
   at least one blade portion defining a hollow cavity in an interior thereof, and fine cooling holes formed through said blade portion to communicate said hollow cavity with an exterior of said nozzle; and
   shroud portions integrally joined with said at least one blade portion, each of said shroud portions having at least one through hole formed therethrough in communication with said hollow cavity;
   said ceramic gas-turbine nozzle having a profile degree no greater than 1.0% relative to a length of said blade portion, said fine cooling holes having a roundness no greater than 0.3 mm and a straightness no greater than 1% relative to the length of said blade portion.

2. The ceramic gas-turbine nozzle of claim 1, wherein said blade and shroud portions consist essentially of a ceramic which has an initial JIS four-point flexural strength of at least 600 MPa, a fatigue parameter (N) of at least 50 at a temperature of 1400° C., and an initial heat-resistant impact strength, and said ceramic retains a JIS four-point flexural strength of at least 50% relative to the initial JIS four-point flexural strength thereof and a heat-resistant impact strength of at least 70% relative to the initial heat-resistant impact strength thereof after said blade and shroud portions are maintained at 1400° C. for 10,000 hours.

3. The ceramic gas-turbine nozzle of claim 1, wherein said blade and shroud portions comprise at least one ceramic selected from the group consisting of silicon nitride, silicon carbide, stabilized zirconia, partially stabilized zirconia and alumina.

4. The ceramic gas-turbine nozzle of claim 2, wherein said blade and shroud portions comprise at least one ceramic selected from the group consisting of silicon nitride, silicon carbide, stabilized zirconia, partially stabilized zirconia and alumina.

* * * * *